(No Model.) 2 Sheets—Sheet 1.
J. COFFITS.
CORN PLANTER.
No. 566,842. Patented Sept. 1, 1896.
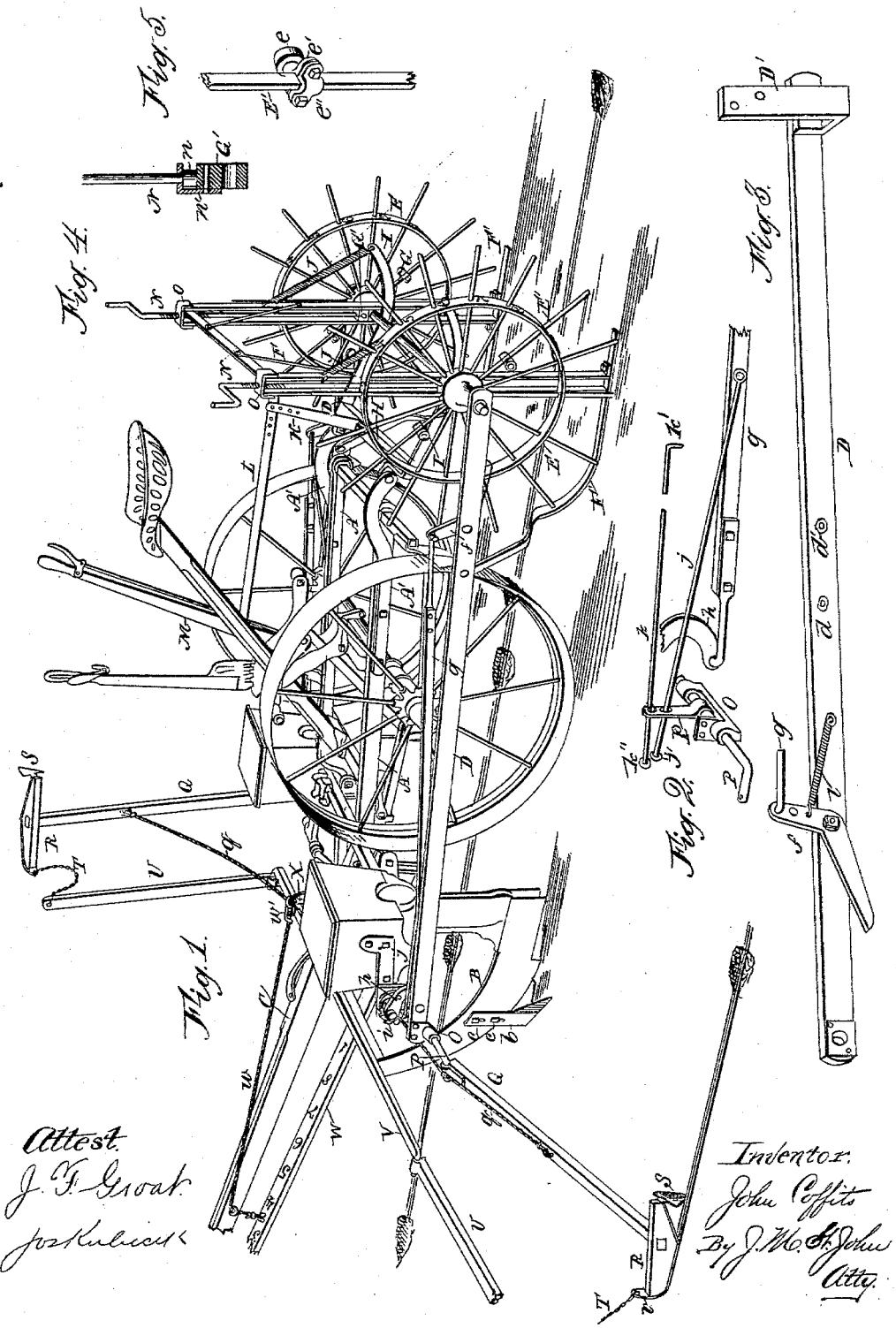
Attest.
J. F. Groat.
Jos Kulick
Inventor.
John Coffits
By J. M. St. John
Atty.

(No Model.) 2 Sheets—Sheet 2.
J. COFFITS.
CORN PLANTER.
No. 566,842. Patented Sept. 1, 1896.
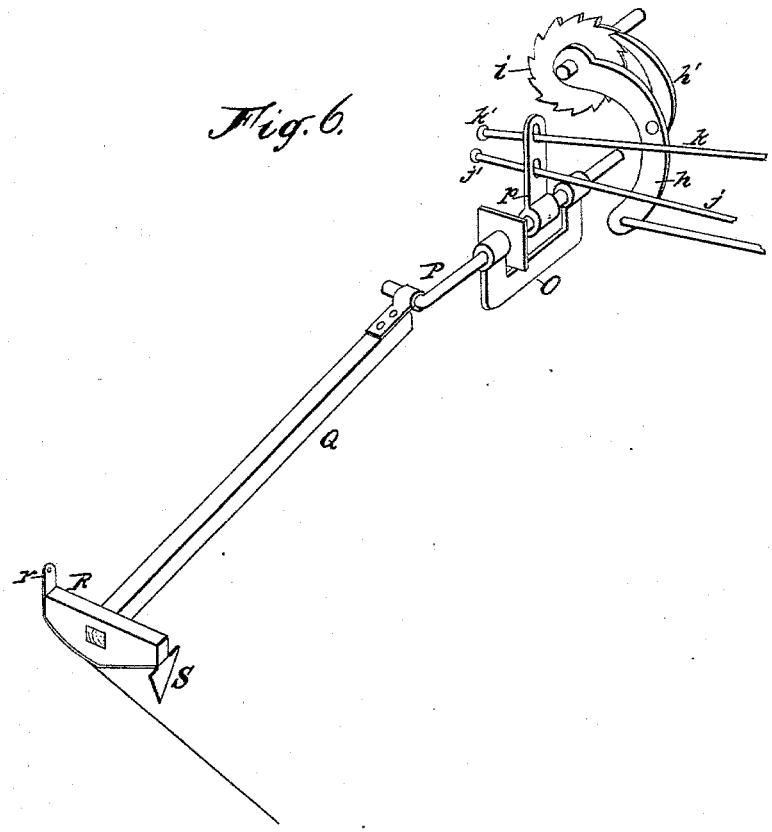

UNITED STATES PATENT OFFICE.

JOHN COFFITS, OF CEDAR RAPIDS, IOWA.

CORN-PLANTER.

SPECIFICATION forming part of Letters Patent No. 566,842, dated September 1, 1896.

Application filed August 23, 1895. Serial No. 560,303. (No model.)

*To all whom it may concern:*

Be it known that I, JOHN COFFITS, a citizen of the United States, residing at Cedar Rapids, in the county of Linn and State of Iowa, have invented certain new and useful Improvements in Corn-Planters; and I do hereby declare the following to be a full, clear, and exact description of the invention, such as will enable others skilled in the art to which it appertains to make and use the same.

This invention relates to that class of corn-planters designed to drop the corn automatically without the use of a check-row wire, and embodies certain improvements in a corn-planter for which Letters Patent were granted me on the 19th day of March, 1895, numbered 535,941.

The nature and purpose of the improvements will be hereinafter fully set forth and claimed, reference being had to the accompanying drawings, in which—

Figure 1 is a view in perspective of a planter embodying the invention. Fig. 2 is a similar view in detail, showing the mechanism for actuating the feed and marker. Fig. 3 is an inner view of one of the side bars connecting the spacing-wheels with the planter and connected parts. Fig. 4 is a longitudinal section of one of the bearings for the spacing-wheel axle and a connected adjusting-rod. Fig. 5 shows a simple manner of connecting a feed-actuating roller with one of the spokes of the spacing-wheels. Fig. 6, Sheet 2, is a view in perspective showing the marker, means for oscillating the same, and means for intermittently rotating the feed.

Similar letters of reference indicate corresponding parts.

The subject-matter of the invention is an attachment for corn-planters generally, and is of such a nature as to be connected with any of the planters in common use with but slight modifications in the structure, as hereinafter described. The corn-planter herein illustrated may therefore be regarded as typical, and need not be particularly described.

Referring to the drawings, A A are the two main longitudinal bars of the planter-frame, which is mounted on the usual running-gear. To this is connected the dropping apparatus B, the whole being drawn by a suitable tongue C.

Back of the planter is placed the hill-spacing apparatus, consisting of a pair of spacing-wheels or spiders having spokes projecting outside the supporting-rim and a pair of runners mounted to run on the ground adjacent to the wheels. In the patent above referred to this spacing mechanism was coupled to the planter by a pair of reaches passing under the main axle of the planter. In practice this was found to be inconvenient and not well adapted to give the requisite oscillation to the planter in passing over rough ground. I have therefore improved this feature by providing two side-bar reaches D D, which at the rear ends have bearings for the axle of the spacing-wheels and at the forward end connect pivotally with a bracket D', secured to some suitable part of the dropper mechanism, as the seedbox. This construction gives unlimited swing up and down, and is extremely simple and easily applied. To each bar is pivoted a bell-crank lever $f$, provided with a suitable retractile spring $l$. These levers connect by rods $g$ $g$ with the feed mechanism. A rotary feed is indicated. This is provided with a ratchet $i$, which is actuated by a pawl $h'$ on the arm $h$. The lower end of this arm connects pivotally with the forward end of the rod $g$. It will thus be seen that a partial rotation is given to the feed through the reciprocating motion of the rod $g$, and this is effected by the oscillation of the bell-crank $f$, the free end of which is in the path of rolls $e$ $e$, mounted on one or more spokes of each spacing-wheel. A simple manner of attaching the roll to the spoke is shown in Fig. 5. The roll-stud $e'$ has a socket or recess fitting one side of the spoke E'. A clamp-plate $e''$, provided with suitable cap-screws, holds it at any desired point on the spoke. In practice the spokes are preferably made of rectangular material comparatively thin, so as to readily penetrate the soil, though dry and hard and wide enough to give a firm hold therein for the propulsion of the feed apparatus.

The pivotal connection of the reach-bars at the forward end should be in axial line, or nearly so, with the normal position of the pivot connecting the rod $g$ with the feed-arm $h$, so that the operation of the feed is not disturbed by any changes in the angle of the reach-bars with respect to the planter.

The penetration of the spokes of the spacing-wheels E E is regulated by a pair of runners F' F', attached at the forward ends to the reach-bars, with the tread of the runners near the spokes, as shown. To each runner is secured a pair of vertical parallel bars F F, between which are mounted the bearings G' G' for the axle of the spacing-wheels. These bars are connected at the upper ends by cap-plates o o, which form nuts to receive screw-threaded rods N N for vertical adjustment of these bearings. A simple connection with the boxes is shown in Fig. 4. The lower end of the rod is provided with a suitable head $n$, and the rod is connected pivotally with the bearing by a bracket $n'$, fastened thereto. Cranks at the upper ends of the rods enable them to be easily turned to elevate or depress the spacing-wheels with respect to the runners.

Provision is made for raising the entire spacing apparatus so as to facilitate turning at the ends of the rows, and also for depressing it so as to force the spacing-spokes into the ground when in operation. To the frame-bars A A of the planter are secured rearwardly-extending bars or hangers A' A'. To the rear ends of these bars is pivoted a bail composed of a cross-beam H and a pair of curved arms I I, extending backwardly under the axle of the spacing-wheels. The rear ends of the bail-arms connect by springs J J with the uprights F F. To the cross-beam H is secured an arm K, connecting by a rod L with a lever M. When the lever is pushed forward, the spacing apparatus is lifted clear of the ground, as will be evident. When thrown back, the same is depressed, and any desired pressure may be brought to bear to force the spacers into hard ground. The springs at the same time admit of sufficient freedom of movement on the part of the spacing-wheels and runners to conform, as far as may be necessary, to inequalities in the surface of the ground.

In a bearing O, secured to the forward end of each reach-bar, is mounted a cranked rock-shaft P. This is provided with an upwardly-extending crank-arm $p$, having elongated orifices therein to receive rods $j$ and $k$. The rod $j$ is attached at one end to the rod $g$ and moves back and forth therewith. At the other end is a suitable button or ball $j'$ to engage with the crank-arm on the back stroke. A similar ball $k''$ is provided at the forward end of the rod $k$ and a hook $k'$ at the other end. This hook engages with the eyes $d$ and $d'$ on the bar D to hook the crank-arm back or allow it to swing forwardly, as may be respectively desired.

To the cranked outer end of the rock-shaft is hinged a bar Q, having a shoe R at the outer end adapted to run on the ground and make a guide-mark for the driver. This mark is straddled at the next round. At the rear end of the shoe, which is angled or curved on the under side so as to rock back and forth, is a shovel S, normally clear of the ground. This shovel is in line with the dropped corn transversely, and when the shoe is rocked backwardly digs a shallow hole to serve as a guide in starting the planter on the succeeding rows. This is done by the reciprocating motion of the feed-rod $g$ in connection with the rod $j$, as described. By hooking the rod $k$ in the rear eye $d$ the shovel is turned to digging position, and may thus be used as a continuous marker.

To give perfect freedom of movement to the shoe in passing over the ground, I prefer to draw it by a chain T, connecting the upturned forward end of the shoe $r$ with a laterally-extending draw-bar U. This is hinged to a bar V, secured to the forward end of the planter, so that the whole may be folded up when not in use or in passing through gates or the like. A cord or chain $q$, passing through the eye of a post X, enables the operator to fold up the parts from his position on the seat.

The proper position of the spacing-wheels in starting a new row is determined by means of a numbered gage-bar W, suspended from the tongue and provided with a cord $w$, passing through an eye at one side of the tongue, by means of which it is held in elevated normal position or may be dropped to or near the ground. A hook $w'$ holds it in the suspended position. The numbers on the bar correspond with the numbers marked on the spacing-wheels and bear the same relation to the holes scooped out by the marking-shovel S that the numbers of the wheels do to some particular spoke, as, for example, the vertical spoke at the time of dropping. The spaces between the numbers on the gage-bar should coincide with the working spaces between the spokes of the spacing-wheels. It thus becomes a simple matter for the operator to determine exactly the proper position of the spacing-wheels in starting a new row across the field. He has simply to drop the gage-bar on commencing a row, note the number at the hole under it, and then set the spacing-wheels (which are supposed to be clear of the ground) so that they stand in exactly the same relative position as before turning around. For example, if spoke 3 be uppermost when "3" of the gage-bar scale coincides with one of the marked holes in the ground on leaving off at the end of a row then this would of course be the proper position of the parts in starting in a new row; and the same is true of all the other members, so that wherever the operator may happen to stop in starting in a new row the number nearest the hole in the ground will indicate the spoke to be set uppermost or in any other predetermined position. It is evident, also, that sighting across these holes transversely will enable the operator to determine at all times whether the planting alines in this direction and to correct any tendency to faults in this respect, if there be any.

In order to provide the spacing-wheels with as smooth a path as possible, a plow-like fender $b$ may be attached to the runners of the planter B, and thus serve to push aside such clods or stones as would tend to disturb the uniform movement of the spacing-wheels. Slotted holes for the bolts $c\ c$ admit of adjustment of these fenders. It will be understood that the spacing-wheels are both secured to their axle, so as to move concurrently.

Having thus described my invention, I claim—

1. The combination with a planter, of a pair of runners having upwardly-extending standards to receive movably the bearings for the axle of a pair of spacing-wheels, spacing-wheels attached to said axle, and mounted contiguous to the runners, a bail hinged to the planter forward of the axle and having rearwardly-extending arms passing under the said axle, a hand-lever and connections adapted to actuate said bail and springs connecting the ends of said arms with the runner-standards and adapted to draw them upwardly, as described.

2. In a corn-planter, the combination with suitable spacing mechanism, substantially as described, of a longitudinally-reciprocating feed-rod moved intermittently by said spacing mechanism, a laterally-extending, rocking marker, oscillating in the plane of the planter's forward movement and a connection thereof with said feed-rod, substantially as and for the purpose set forth.

3. In a corn-planter, the combination with the reciprocating, automatically-actuated feed-rod, of a cranked rock-shaft, a rocking marker hinged thereto, a rod connecting with said feed-rod, and having a loose connection with a crank-arm of said rock-shaft, and provided with a button or ball to engage intermittently therewith, when in normal position, and a shift-rod having a similar connection with said crank-arm, whereby the crank-arm may move back and forth on the shift-rod, or the other rod may move in the crank-arm, as described.

4. In a corn-planter, the combination of the hinged draw-bar U, the rocking marker R hinged to the laterally-extending rock-shaft P, the draft-chain T and the lifting-cord $q$, substantially as and for the purpose set forth.

5. In a corn-planter, the combination with one or more spacing-wheels having projecting spokes, with numbers to designate their relative position with relation to the feed-tripping device, feed-actuating mechanism connecting with said wheel and with a ground-marker, and a forwardly-extending gage-bar, spaced and numbered to correspond with the spacing-wheel spokes, and movable up and down, whereby it is adapted to be dropped down to or near the ground, the number on the bar coincident with the marked spot in the ground determining the proper position of the spacing-wheel in starting a new row, as specified.

6. In a corn-planter, the combination with the tongue, of a numbered gage-bar suspended therefrom, and a cord to draw the same up and support it alongside said tongue when not in use.

In testimony whereof I affix my signature in presence of two witnesses.

JOHN COFFITS.

Witnesses:
JAMES W. DALBEY,
J. F. GROAT.